US009659566B2

(12) United States Patent
Schuller et al.

(10) Patent No.: US 9,659,566 B2
(45) Date of Patent: May 23, 2017

(54) DEVICE AND METHOD FOR GENERATING AND DECODING A SIDE CHANNEL SIGNAL TRANSMITTED WITH A MAIN CHANNEL SIGNAL

(71) Applicant: Fraunhofer-Gesellschaft zur Foerderung der angewandten Forschung e.V., Munich (DE)

(72) Inventors: Gerald Schuller, Erfurt (DE); Stefan Wabnik, Oldenburg (DE); Bernhard Grill, Lauf (DE); Alexander Zink, Stegaurach (DE)

(73) Assignee: FAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/722,220

(22) Filed: May 27, 2015

(65) Prior Publication Data
US 2015/0255077 A1 Sep. 10, 2015

Related U.S. Application Data

(60) Division of application No. 14/101,403, filed on Dec. 10, 2013, now Pat. No. 9,099,079, which is a
(Continued)

(30) Foreign Application Priority Data

Jan. 22, 2007 (DE) ........................ 10 2007 003 187

(51) Int. Cl.
*G10L 19/008* (2013.01)
*H04L 27/26* (2006.01)
(Continued)

(52) U.S. Cl.
CPC ............ *G10L 19/008* (2013.01); *G08C 19/34* (2013.01); *G10L 19/16* (2013.01);
(Continued)

(58) Field of Classification Search
None
See application file for complete search history.

(56) References Cited

U.S. PATENT DOCUMENTS 4,891,806 A 1/1990 Farias et al.
5,222,077 A * 6/1993 Krishnan .......... H04L 25/03343
375/261

(Continued)

FOREIGN PATENT DOCUMENTS

CA 2 482 427 A1 10/2003
CN 1498397 A 5/2004
(Continued)

OTHER PUBLICATIONS

Schuller et al., "Device and Method for Generating and Decoding a Side Channel Signal Transmitted With a Main Channel Signal", U.S. Appl. No. 14/101,403, filed Dec. 10, 2013.

*Primary Examiner* — Leon-Viet Nguyen
(74) *Attorney, Agent, or Firm* — Keating & Bennett, LLP

(57) ABSTRACT

For generating a signal to be transmitted original information is encoded into a main channel and a side channel, wherein the side channel is more robust against channel influences than the main channel. On the receiver side, when the receive quality is above a threshold, which is necessitated to execute a successful decoding of the main channel, the main channel is reproduced. If the receive quality falls below this threshold, however, the side channel is reproduced which may have less bits than the main channel and which is a correspondingly lower quality representation of the original information than the main channel.

19 Claims, 4 Drawing Sheets

Related U.S. Application Data continuation of application No. 12/523,768, filed as application No. PCT/EP2008/000423 on Jan. 21, 2008, now Pat. No. 8,724,714.

(51) Int. Cl.

| | | |
|---|---|---|
| G08C 19/34 | (2006.01) | |
| G10L 19/16 | (2013.01) | |
| H04L 27/34 | (2006.01) | |
| H04N 21/2343 | (2011.01) | |
| H04N 21/2383 | (2011.01) | |
| H04N 21/438 | (2011.01) | |
| H04N 21/442 | (2011.01) | |
| H04N 21/63 | (2011.01) | |
| H04L 29/06 | (2006.01) | |
| H04L 5/00 | (2006.01) | |
| H04L 1/00 | (2006.01) | |

(52) U.S. Cl.
CPC ...... *H04L 27/2647* (2013.01); *H04L 27/3488* (2013.01); *H04L 65/607* (2013.01); *H04N 21/2383* (2013.01); *H04N 21/23439* (2013.01); *H04N 21/4382* (2013.01); *H04N 21/44209* (2013.01); *H04N 21/631* (2013.01); *H04L 5/0007* (2013.01); *H04L 2001/0098* (2013.01)

(56) References Cited

U.S. PATENT DOCUMENTS

| | | | |
|---|---|---|---|
| 6,131,180 A * | 10/2000 | Ramesh | H04L 1/0054 |
| | | | 714/790 |
| 8,126,061 B2 | 2/2012 | Cooper et al. | |
| 8,279,985 B2 * | 10/2012 | Liu | H04L 1/0036 |
| | | | 375/260 |
| 2002/0111804 A1 | 8/2002 | Choy et al. | |
| 2004/0190618 A1 * | 9/2004 | Ota | H04N 19/124 |
| | | | 375/240.16 |
| 2004/0194008 A1 * | 9/2004 | Garudadri | H03M 13/29 |
| | | | 714/821 |
| 2005/0237922 A1 * | 10/2005 | Shoemake | H04L 27/2602 |
| | | | 370/208 |
| 2006/0188004 A1 | 8/2006 | Kizu et al. | |
| 2007/0097910 A1 * | 5/2007 | Ji | H04B 7/026 |
| | | | 370/329 |
| 2008/0267288 A1 * | 10/2008 | Garudadri | H04L 1/0014 |
| | | | 375/240.12 |
| 2009/0281812 A1 * | 11/2009 | Jung | G10L 19/24 |
| | | | 704/500 |

FOREIGN PATENT DOCUMENTS

| | | |
|---|---|---|
| CN | 1625768 A | 6/2005 |
| CN | 1745569 A | 3/2006 |
| EP | 1 072 112 B1 | 12/2005 |

\* cited by examiner

DEVICE AND METHOD FOR GENERATING AND DECODING A SIDE CHANNEL SIGNAL TRANSMITTED WITH A MAIN CHANNEL SIGNAL

BACKGROUND OF THE INVENTION

The present invention relates to information encoders which may be used for broadcasting systems, and in particular to information encoders used in digital broadcasting systems.

Digital audio broadcast is continually developing. For some time, DAB (digital audio broadcast) has existed for USW frequencies, and for a short time also DRM (digital radio mondial) has existed for long, medium or short waves.

Such broadcasting systems distinguish themselves by a certain number of data which have to be buffered before the broadcast or radio receiver, respectively, can start data output. When the radio listener switches on his radio receiver, this is not very problematic as the radio receiver simply starts reproducing a little later, and this interval is not perceived by the radio listener as especially disturbing. When the radio listener changes the program, however, the listener is used, from previous systems, to data being output immediately. With a digital broadcasting receiver this is, however, not possible as a certain amount of data has first of all to be stored again by the other program before a reproduction of this other program can be started. This delay will be perceived by the user as disturbing as it does not occur when he starts listening to the radio but while he is listening.

U.S. Pat. No. 6,842,724 B1 disclosed a method and a device for reducing the initial delay in data packet-based streaming applications or in a telecommunication network, like, for example, a local exchange carrier network or an inter-exchange carrier network or a local or global computer network. A program source, for example an audio and/or video data stream, is encoded and transmitted as two or more separate bit streams, for example sequences of data packets. The transmission of one of these bit streams is delayed by a given delay with regard to the transmission of the other bit stream. At the receive end of the transmission channel, the two or more bit streams are buffered by receiver buffers of different sizes, from which different time delays result when the content of the buffers is decoded. In particular, the time delay difference (inverse) corresponds to the relative delay times before transmission. For encoding, either a rewritable source encoding scheme or an embedded encoding scheme is used, wherein at least one of the individual bit streams is sufficient to generate a satisfying decoded signal, wherein adding the other bit stream will improve the quality of the decoded signal. Alternatively, the data streams may be several encoded representations of the program source having different bit rates, wherein encoded representations with a lower bit rate are transmitted with correspondingly greater delays.

In contrast to the transmission types described in the above-mentioned document, in which only the delay of a data package has to be considered, with digital broadcasting systems further challenges occur which result from the fact that the transmission channel is not a line-connected channel but a wireless transmission channel. A transmitter thus comprises a transmit antenna which emits radio waves which may be received and processed by a receiver comprising a receive antenna. Due to the fact that the transmission channel varies, which may be due to the system, and which may also result from the fact that the transmitter and especially the receiver is moving, a transmission channel may become better or worse and, in particular, so bad that the connection from the receiver to the transmitter is abruptly interrupted. In particular, as is generally the case with digital transmission, the connection below an SNR given by the system will simply be interrupted and there will be no so-called "graceful degradation", i.e. a degradation of transmission quality taking place gradually, as occurs with analog radio broadcasting in an agreeable way. The interruption of the connection below an SNR given by the system (SNR=signal noise ratio) is a problem in particular with DRM, as DRM use short wave carriers which have a slowly varying SNR, which results in repeated failures.

With DAB, this threshold of receive quality and/or the SNR at which the connection is interrupted is problematic, as aligning the antenna or finding a good receive position becomes more difficult than in analog broadcasting and becomes even more complex in particular when the receiver is moving.

SUMMARY

According to an embodiment, a device for generating a signal to be transmitted may have an encoder for generating an encoded signal from an information signal, wherein the encoder is implemented to generate a main channel and a side channel which may be decoded separate from each other and represent the information signal, and to generate the main channel and the side channel so that the side channel is more robust against transmission-channel influences than the main channel.

According to another embodiment, a device for generating a decoded signal may have a receiver for receiving a receive signal having a main channel and a side channel which may be decoded separate from each other, wherein a minimal signal/noise ratio for decoding the side channel is smaller than a minimal signal/noise ratio for decoding the main channel; a decoder for generating a main channel which is separate from the side channel; a quality observer for assessing a receive quality; and a changeover switch which is controllable by the quality observer to provide the side channel as a decoded signal when the receive quality is lower than a threshold quality and to provide the main channel as a decoded signal when the receive quality is higher than or equal to the threshold quality.

According to another embodiment, a method for generating a signal to be transmitted may have the steps of generating an encoded signal from an information signal, wherein the encoder is implemented, by generating a main channel and a side channel which may be decoded separate from each other and represent the information signal, and wherein the main channel and the side channel are generated such that the side channel is more robust against transmission-channel influences than the main channel.

According to another embodiment, a method for generating a decoded signal may have the steps of receiving a receive signal having a main channel and a side channel which may be decoded separate from each other, wherein a minimal signal/noise ratio for decoding the side channel is smaller than a minimal signal/noise ratio for decoding the main channel; generating a main channel separate from the side channel; assessing a receive quality; and providing, as a decoded signal, the side channel, when the receive quality is lower than a threshold quality, or providing, as a decoded signal, the main channel, when the receive quality is higher than or equal to the threshold quality.

According to another embodiment, a computer program may have a program code for executing the method of generating a signal to be transmitted, which may have the steps of generating an encoded signal from an information signal, wherein the encoder is implemented, by generating a main channel and a side channel which may be decoded separate from each other and represent the information signal, and wherein the main channel and the side channel are generated such that the side channel is more robust against transmission-channel influences than the main channel, when the computer program runs on a computer.

According to another embodiment, a computer program may have a program code for executing the method of generating a decoded signal which may have the steps of receiving a receive signal having a main channel and a side channel which may be decoded separate from each other, wherein a minimal signal/noise ratio for decoding the side channel is smaller than a minimal signal/noise ratio for decoding the main channel; generating a main channel separate from the side channel; assessing a receive quality; and providing, as a decoded signal, the side channel, when the receive quality is lower than a threshold quality, or providing, as a decoded signal, the main channel, when the receive quality is higher than or equal to the threshold quality, when the computer program runs on a computer.

An embodiment may have an encoded signal having a main channel and a side channel, wherein the side channel is formed such that it is more robust against transmission-channel influences than the main channel.

The present invention is based on the finding that a reduction of unpleasant data failures may be achieved when the one-channel idea is not considered, in which the program material is encoded and transmitted. According to the invention, in addition to the typically transmitted program material representing the main channel, a side channel is generated and transmitted, wherein the main channel and the side channel may be decoded separately from each other and both represent the information signal. The main channel and the side channel are generated, however, so that the side channel is more robust against transmission channel influences than the main channel. When a situation results in which the SNR of the system is smaller than the necessitated SNR for the main channel, i.e. when the transmission channel is such that the robustness of the main channel is no longer sufficient, according to the invention a switchover to the side channel is executed which is more robust against transmission channel influences and may thus still be decoded, while the main channel may no longer be decoded. The connection from the receiver to the transmitter will thus not simply be interrupted, but the reproduction will be continued using the data of the side channel which are robust against the transmission channel influences, although of course no main channel is reproduced any more. As the main channel and the side channel represent the same information, information is still provided to the radio broadcast listener and/or the broadcast viewer.

In embodiments of the present invention it will be the case, however, that the side channel is a substantially more compressed representation of the information than the main channel. In particular in the context of a lossy data compression, thus the reproduction quality in the reproduction of the side channel will be worse than the reproduction quality when the main channel can be reproduced. This is not as problematic from the point of view of the radio broadcasting subscriber, however, as every radio broadcasting subscriber prefers a reproduction with reduced quality to no reproduction at all.

This embodiment is advantageous in particular in so far as the overall data rate for transmitting the main channel and the side channel is not substantially higher than when only the main channel is transmitted, as for encoding a very lossy compressed data signal inherently less bits are needed than for encoding a higher-quality data signal. It is in particular advantageous that the bits necessitated for the side channel are at most half as many as those bits necessitated for the main channel and in particular even less than a tenth of the bits necessitated for the main channel.

In a further embodiment, the main channel and the side channel are not transmitted synchronously to each other, but with a time shift so that the main channel is delayed with regard to the side channel. On the receiver side, the side channel which arrives at the receiver earlier—with regard to a certain point in time of the original information data—is buffered into the receiver while no or only a limited buffering of the main channel is necessitated. This means that when the transmission channel situation is favorable, the main channel can be transmitted without delay and also switching over from the main channel to another main channel is possible without problems. The occurrence of a switching delay would only be perceivable if a transmission channel degradation took place exactly at the time of switching, with the consequence that the side channel would have to be used.

The delay of the main channel as compared to the side channel is further advantageous to the extent that, when a transmission failure occurs which is so severe that not even the side channel is received with sufficient quality, the side channel can be reproduced at least for the time period for which the side channel was stored. In embodiments, a storage time of more than 10 seconds and, in particular, of even more than 20 seconds, and advantageously more than 30 seconds, is selected, which, while leading to a certain storage requirement, is not critical with regard to the favorable availability of large memories. The decisive advantage is, however, that the radio broadcast receiver may replay for 30 seconds solely from its own memory —although of lower quality —without the same receiving valid signals. The fact that the side channel needs less bits than the main channel simultaneously eases the necessitated memory requirement in the receiver, which a user will be glad to accept, as the reception of the side channel is already an emergency situation which does not correspond to a normal situation but, when the side channel guarantees intelligibility of speech, is particularly agreeable for the user when the user is listening to an interesting radio program in which the spoken word is particularly important and its intelligibility is guaranteed by the side channel.

Other features, elements, steps, characteristics and advantages of the present invention will become more apparent from the following detailed description of preferred embodiments of the present invention with reference to the attached drawings

BRIEF DESCRIPTION OF THE DRAWINGS

In the following, embodiments of the present invention are explained in more detail with reference to the accompanying drawings, in which.

DETAILED DESCRIPTION OF THE INVENTION

According to the invention, a so-called "graceful degradation" is achieved, i.e. a radio broadcasting reproduction of audio and/or video data below the threshold needed for the main channel. Thus, the side channel, e.g., contains the data of a low bit rate coder having the same content as the main channel. It is the purpose to generate a substitute signal when failures occur which may be implemented, e.g. based on the technology of generating comfort noise in speech encoders, i.e. using data transmitted in the side channel. This data is used in the receiver-side signal synthesis, in order not to leave signal synthesis only with noise generation but to control the signal synthesis at least in such a detailed way that speech intelligibility is, for example, produced in such a way that e.g. news can still be understood.

Further, in one embodiment, a time shift between the main channel and the side channel is executed, so that the main channel is delayed with regard to the side channel. According to the invention, further a more robust modulation is executed for the side channel than for the main channel with the main audio data.

A modulus in DRM technology for the main channel, which is referred to there as a media service channel (MSC), has a bit rate of 14.5 kb/s, for example. In the side channel, in this embodiment additional data are transmitted with 1 kb/s in the SDC (service description channel) in a more robust way and, e.g., encoded with an advance of 30 seconds. The main channel is, therefore, delayed by 30 seconds as compared to the additional channel. When the connection is interrupted for up to 30 seconds, the side channel is reproduced. If the SNR is reduced below the threshold of the MSC, but above the threshold of the SDC, the side channel is also reproduced. The invention may thus be used in a transmission system for digital media transmission in which the main channel exists which comprises main media data and in which further the side channel exists in which the same media data is represented with a higher compression and a lower bit rate, wherein the side channel has a more robust modulation than the main channel, which necessitates a lower minimal SNR for the transmission and the encoding of the side channel as compared to the main channel. Depending on the implementation, the main channel may be delayed in time with regard to the side channel.

Figure 1:
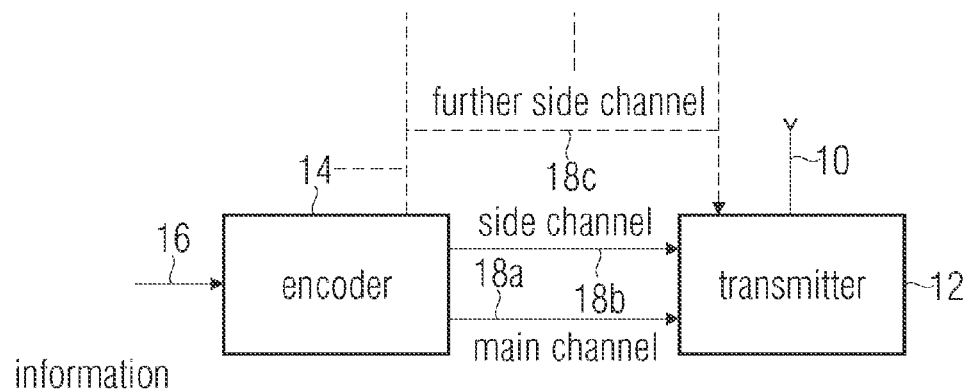
FIG. 1 shows a block diagram of an embodiment of a device for generating a signal to be transmitted.

In the following, detailed reference is made to FIGS. 1 to 7. FIG. 1 shows a device for generating a signal to be transmitted which is finally output by a transmit antenna 10 which receives its transmit signal from a transmitter 12. An encoder 14 is connected upstream from the transmitter 12 which receives information 16 as input data which include audio and/or video information, and which provides an output signal to the transmitter 12 including both main-channel data 18a and also side-channel data 18b. Depending on the implementation of the encoder 14 and the transmitter 12, the data 18a, 18b is transmitted between the encoder 14 and the transmitter 12 in two separate data streams, or the data is multiplexed or transmitted to the transmitter already after a carrier modulation in a data stream, wherein the transmitter then only has the task, as is performed by a typical HF front end, i.e. to mix and amplify the base data signal onto an HF carrier.

In particular, the encoder is implemented to generate the main channel 18a and the side channel 18b which may be decoded separate from each other and thus both represent the information signal.

To obtain a decoded version of the information, according to the invention, either the side channel or the main channel is sufficient. In other words, the data of the side channel alone without the data of the main channel is sufficient to provide at least a lower-quality representation of the information on the encoder side.

According to the invention, the encoder 14 is further implemented to generate the main channel 18a and the side channel 18b such that the side channel is more robust against transmission channel influences than the main channel. This robustness may be generated in different ways, for example by the use of a more robust modulation for the side-channel data or by introducing a higher redundancy into the side-channel data than into the main-channel data.

Figure 2:
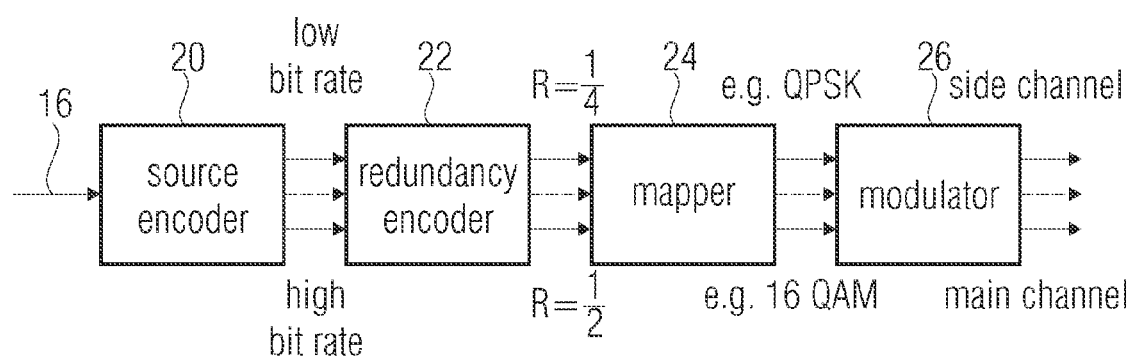
FIG. 2 shows different embodiments of the encoder of FIG. 1.

FIG. 2 shows a detailed illustration of the encoder 14 according to different embodiments of the present invention which are optionally illustrated in FIG. 2. The encoder 14 may include a source encoder 20, a redundancy encoder 22, a mapper 24 and/or a modulator 26. Information 16 is fed into the source encoder 20. Depending on the implementation, the source encoder 20 already provides the side channel 18b and the main channel 18a, as is illustrated by the continuous lines between the source encoder 20 and the redundancy encoder 22. Alternatively, however, the source encoder may be implemented such that it only provides one single version which is then, as is illustrated by the dashed line between the block 20 and the block 22, fed into the redundancy encoder 22, which then, for example by different redundancy encoding which is reflected by different code rates, generates the side channel 18b and the main channel 18a on the output side, as is illustrated by the continuous lines between block 22 and block 24. Alternatively, the redundancy encoder might also be implemented to generate only one single redundancy-encoded data stream on the output side which, as is illustrated by the dashed line between block 22 and block 24, is fed into the mapper 24 which than generates the main channel 18a and the side channel 18b using different mapping rules.

Alternatively, the mapper 24 may also generate one single output data stream and supply the same to the modulator 26, which, e.g., executes an FDMA, TDMA or CDMA modulation method, i.e. one of the known frequency multiplex, time multiplex or code multiplex methods or a combination of those methods, as it is known in the art. Depending on the implementation, the modulator may provide one single signal on the output side, which would then include both the main channel and also the side channel already in one single data stream, or the modulator may provide the side channel and the main channel as separate data streams which are then combined with each other in the transmitter 12 before one single antenna signal is emitted which includes both channels.

In principle, it is sufficient that in one of blocks 20, 22, 24, 26 different channels with different robustnesses are generated. However, also different robustnesses may be cumulated. Thus, for example the side channel generated by the redundancy encoder 22, which is per se already more error-resistant due to the greater redundancy, may additionally be subjected to a mapping rule in the mapper which is more robust than another mapping rule with which the main channel may be provided, wherein additionally in the modulator for the side channel a more error-resistant modulation method may be used than for the main channel.

According to the invention it is advantageous, however, for the source encoder 20 to generate two different output data streams, wherein the side channel has a low bit rate and the main channel has a high bit rate which may then be processed by a combination of blocks 22, 24, 26, or which, e.g., only receive a different robustness by the redundancy encoder 22, wherein the redundancy encoder then already combines both data streams according to a certain regulation on the output side so that only one data stream enters the mapper 24 and one data stream exits the same. Alternatively, however, the redundancy encoder may simply process both input-side data streams with the same code rate, wherein the mapper or the modulator would then generate the more different robustness of the two data channels.

Different robustnesses may be achieved in the redundancy encoder according to the invention, e.g. by using a Reed-Solomon code or an FEC code, e.g. with a feedback shift registers, comprising a certain generator polynomial and operating with or without puncturing. The code rate describes the number of output bits for a certain number of input bits and is smaller than 1 due to the redundancy adding. For the side channel a code rate smaller than 0.5 may be used, while for the main channel a code rate higher than or equal to 0.5 may be used.

With regard to the mapper 24, for the main channel and the side channel different mapping rules may be used. A mapping rule has a certain number of symbols in the complex plane, wherein for a QPSK mapping only four symbols exist in the complex plane, while for a 16-QAM mapping for example 16 symbols exist in the complex plane. This means that a decoder with QPSK only has to differentiate between four different symbols, while a decoder with 16 QAM already has to differentiate between 16 different symbols. The minimal SNR for a QPSK mapping is thus substantially lower than the minimal SNR for a 16-QAM mapping. However, for every modulation symbol in a 16-QAM mapping four data bits are transmitted, while with OPSK for each symbol only two data bits have to be transmitted. Mapping has a great influence on robustness against transmission channel influences.

Alternative modulation methods may also be used, like, for example, DPSK or 8 QAM. Also hierarchical modulation methods in which, e.g., a 16 QAM is overlaid onto a QPSK, may be implemented for the different channels. Thus, also for the main channel 64 QAM may be used, and for the side channel 16 QAM may be used.

Also in the modulator 26 different robustnesses may be generated, when, e.g., for a CDMA modulation code sequences of a different length are used for the side channel and/or for the main channel, or when in an FDMA modulation for the different channels different frequency bandwidths are used, or in a CDMA modulation time slots of a different length are used.

In the following, reference is made to implementations of the source encoder 20 of FIG. 2. Depending on the implementation, the source encoder of FIG. 2 may include an audio encoder 30 and a speech encoder 32, connected in parallel. A delay is connected between the audio encoder 30 and a combiner, like, e.g., a multiplexer 34, wherein the delay means is designated by 36. It may, e.g., be implemented as an FIFO memory which is dimensioned such that more than 10 seconds, advantageously more than 20 seconds and in particular more than 30 second of data is stored. The delay means 36 thus feeds the MSC input of the combiner 34, while the speech encoder 32 in this implementation feeds the SDC input of the combiner. Of course, also additional delays may exist both in the main channel and also in the side channel 18a, 18b, as long as the delays in the main channel are greater than the delays in the side channel. In particular, the data rate in the MSC, which is the media service channel, is 14.5 kb/s, while the data rate in the side channel, which is the SDC and/or the service description channel, is at 1 kb/s.

Other data rates are also possible, wherein in particular ratios between the MSC and the SCD and/or between the main channel and the side channel of <2, in particular <5 and again in particular <10 are advantageous.

Figure 3:
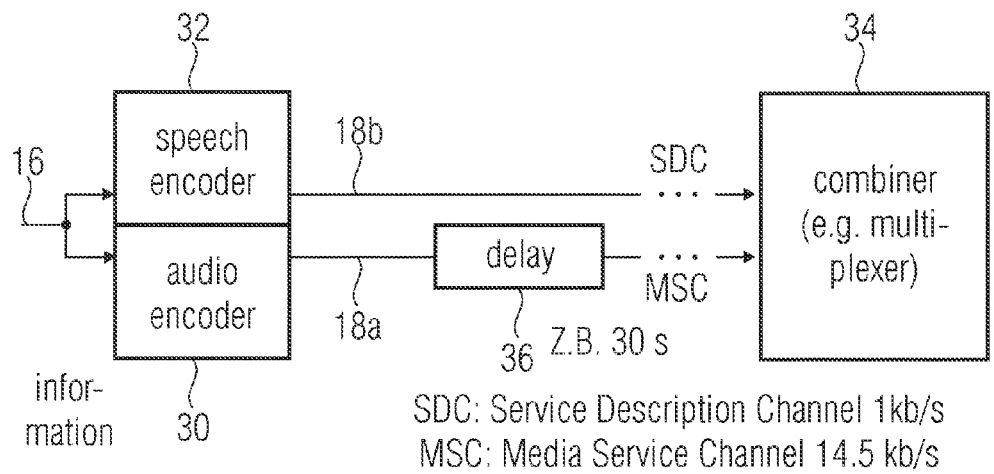
FIG. 3 shows an alternative embodiment of the encoder of FIG. 1.

In the embodiment illustrated in FIG. 3, thus the encoder 8 which generates the main channel 18a is an audio encoder and is implemented separately from the encoder 32 which generates the side channel 18b and is only implemented as a speech encoder. The speech encoder 32 may provide complete speech encoder frames. It may, however, alternatively also only output coefficients as a side channel serving for describing the spectral envelope. In particular, the speech encoder 32 will be implemented such that the coefficients for describing the spectral envelope are quantized so finely and are transmitted so often that on the receiver side using this information a speech intelligibility is achieved. If the speech encoder is implemented as an LPC encoder it is advantageous to transmit the LPC coefficients which were calculated by the speech encoder or it is advantageous to transmit coefficients derived from the LPC coefficients (LPC=linear predictive coding). Coefficients which are derived from LPC coefficients are, for example, quantized or differentially encoded (delta-encoded) coefficients, as it is indicated at 40 and 42 in FIG. 4.

Figure 4:
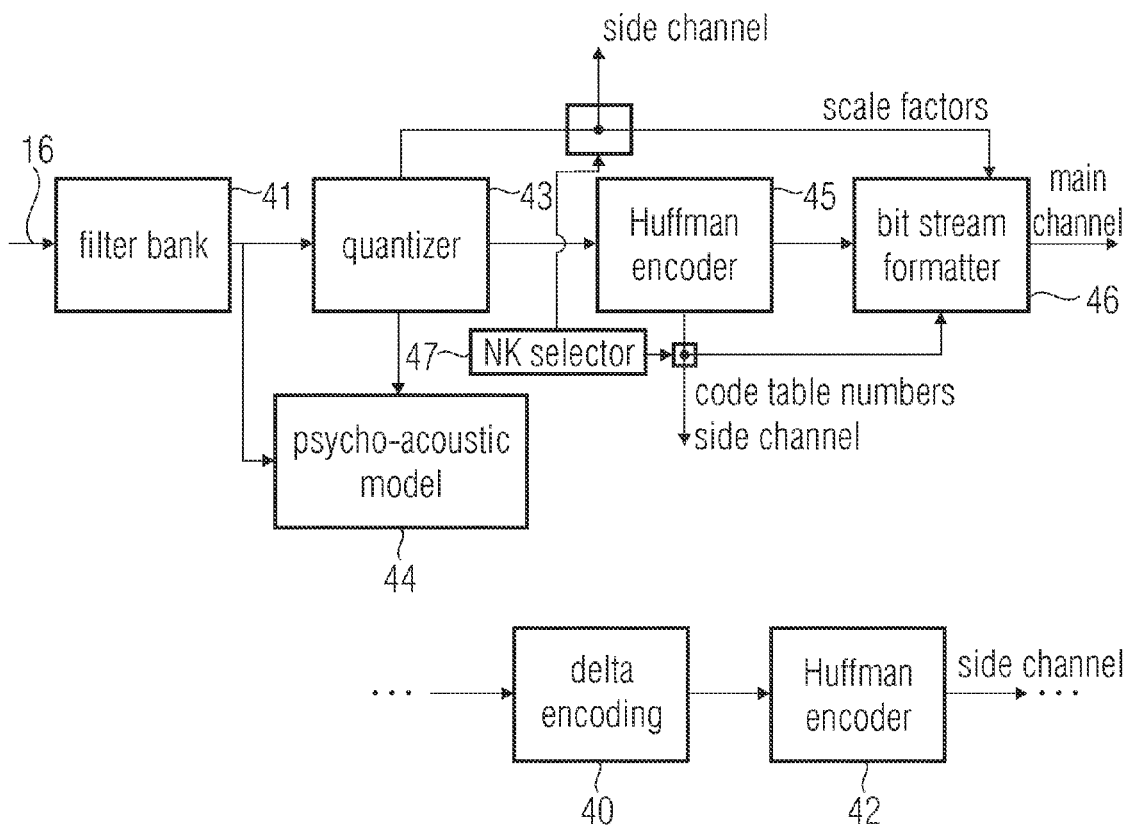
FIG. 4 shows a special implementation of the source encoder of FIG. 2.

Alternatively, the source encoder 20 of FIG. 20 may also be implemented as it is illustrated in FIG. 4. Such an encoder is, for example, used according to MPEG-4 or MPEG-1, Layer III (MP3). By a filter bank 41, the information signal 16 is converted into a spectral illustration supplied to a quantizer 43. The filter bank 41 may here be a subband filter bank, e.g. having 16 or 32 filter bank channels, or may be an MDCT filter bank, e.g. having 512 coefficients or 1024 coefficients, wherein also an overlap and add functionality for the time domain aliasing cancellation (TDAC) is to be used in a corresponding decoder.

The spectrum output by the filter bank 41 and/or the spectral illustration output by the filter bank 41 is quantized in the quantizer 43. The quantizer 43 is controlled by a psychoacoustic model 44 which is implemented to calculate the psychoacoustic masking threshold for each band and to make the quantization so coarse that the quantization noise is below the masking threshold. The quantized spectral values output by the quantizer 43 are supplied to a Huffman encoder 45. It is noted that the quantizer 43 not only calculates quantized spectral values but also scale factors which represent the spectral coarse structure of the spectral illustration. In contrast, the spectral fine structure is contained in the quantized spectral values.

For Huffman encoding, the Huffman encoder 45 uses a plurality of predefined code books, wherein according to the MPEG-AAC standard twelve different code tables are used which are all different in the value range of the elements and/or spectral values or groups of spectral values encoded by the code table. Every code table is identified by its code table number, which is, just like the scale factors, supplied to a bit stream formatter 46 and necessitated on the decoder side to execute a decoding using the correct code table.

The output data stream generated by the bit stream formatter 46 then represents the main channel, while the side channel is generated using a side channel selector 47. The side channel selector is implemented to select a certain portion of the data coming into the main channel to occupy the side channel using these data. The less data is selected, the lower the data rate will be in the side channel, which is desirable for reasons of a responsible handling of the transmission bandwidth. However, a certain minimum measure of data is needed not only to generate a pink noise on the receiver side but to be better, for example to cause speech intelligibility. For this purpose, scale factors and/or code table numbers are supplied depending on the suitability and necessity of a delta encoding 40 and a subsequent Huffman encoding 42. For the code table numbers, a delta encoding will not be as suitable. However, by a delta encoding of scale factors a further redundancy reduction may be achieved. The quantized spectral values are not transmitted in the side channel. I.e., the spectral fine structure is not transmitted in the side channel. Here, only the spectral coarse structure exists.

Depending on the implementation, the side-channel data may thus come from a low-rate speech encoder or from a low-rate audio encoder. Thus, even a part of or also all coefficients of the side channel may come from coefficients of the encoder of the main channel. In particular, when the main encoder is a subband-based audio encoder, it is advantageous to select the coefficients of the encoder of the main channel, representing the scale factors, into the side channel. Depending on the implementation, the indices for Huffman code books may also be used as selection data.

It is in particular to be noted, as is also indicated in FIG. 1, that further side channels 18c may be used which may be equipped with different time offsets and/or different robustnesses for transmission.

Figure 5:
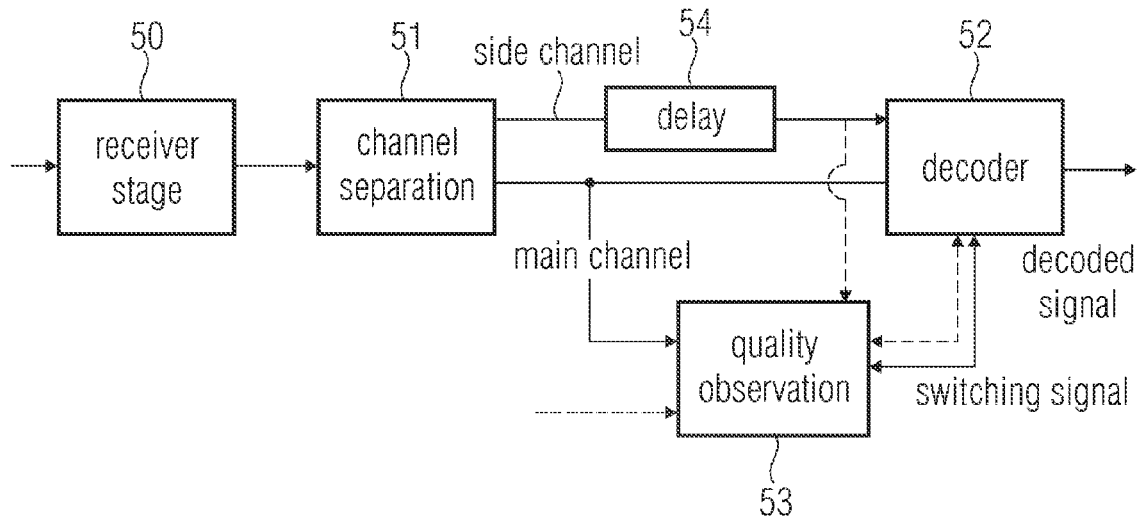
FIG. 5 shows a device for generating a decoded signal.

FIG. 5 shows a special implementation of a device for generating a decoded signal according to an embodiment. The device illustrated in FIG. 5 includes a receiver stage 50 which may be coupled, e.g., to a receive antenna which is not illustrated in FIG. 5. Then, the receiver stage 50 contains a typical receiver front end, for example with a downmixer with a coupled local oscillator, to downmix the transmitted spectrum into the base band and/or into an intermediate frequency band.

The receive signal which is received by the receiver stage 50 includes a main channel and a side channel which may be decoded separately from each other. In particular, a minimal signal/noise ratio which is needed for decoding the side channel is smaller than a minimal signal/noise ratio which is needed for decoding the main channel. I.e., the side channel is more robust against transmission characteristics of the transmission channel than the main channel.

Downstream from the receiver, depending on the implementation, a channel separation stage 51 is connected to separate the side channel from the main channel already on the HF side. Depending on the implementation, this functionality may, however, also be integrated in a decoder 52 which is directly coupled to the receiver and which generates the main channel separate from the side channel. The inventive broadcasting subscriber device, as is illustrated in FIG. 5, further includes a quality observer 53 which is implemented to assess the receive quality. Here, a quality observer may fall back on different signals schematically indicated by continuous and/or dashed lines in FIG. 5. The quality observer 53 may observe the main channel before decoding and/or before a delay possibly used there or after a delay possibly used there. The quality observer 53 may, however, alternatively or additionally, also use output data of the decoder and/or certain intermediate data which arise in decoding and/or decoder output information. If the decoder for example determines in the Huffman decoding that a certain number of invalid code words exists, this already indicates a bad receive quality which is reported to the quality observation and/or monitoring means 53.

The quality observation means 53 is implemented to provide a switchover signal when a receive quality is determined which is less than a receive quality source, wherein the signal is, in the most general case, supplied to the decoder 52 which may then switch over from a reproduction of the main channel to a reproduction of the side channel.

The changeover switch which is, e.g., contained in the decoder 52 or which may also be implemented separately may thus be controlled by the quality observer to provide the side channel as the decoded signal when the receive quality is less than a threshold quality, and to provide the main channel as a decoded signal when the receive quality is greater than or equal to the threshold quality.

In the following, with reference to FIG. 6, an alternative embodiment of the inventive receiver is illustrated. The functionality of the elements 51, 52, 53 is implemented in FIG. 6 by alternative and/or by additional elements, while the delay 54 of FIG. 5 which is used to delay the side channel with regard to the main channel, i.e. to compensate the encoder-side delay, is not illustrated in FIG. 6. It is to be noted that the delay may be built in between any blocks in order to guarantee that, in case a complete breakdown occurs, at least according to the data stored in the delay means a data output may be executed solely using the data already stored within the decoder.

Figure 6:
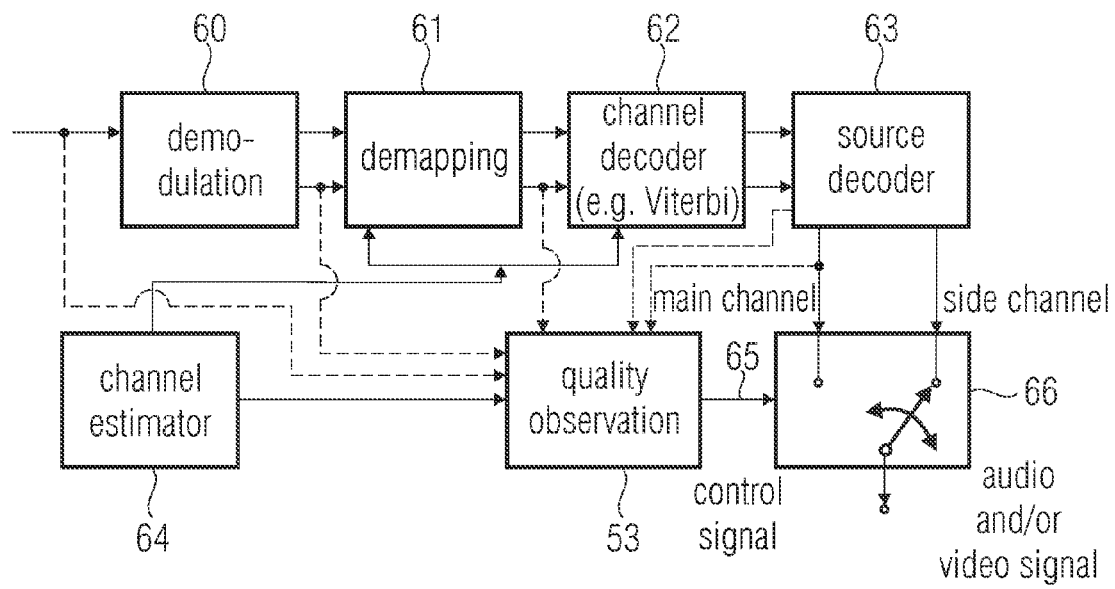
FIG. 6 shows a special embodiment of the device of FIG. 5.

In FIG. 6, a demodulator 60 is connected downstream to the receiver stage 50 of FIG. 5, wherein the demodulator may execute a demodulation of the underlying modulation method, like, e.g., of a TDMA, FDMA or CDMA method. Hereupon, depending on the implementation, a demapper 61 may be connected downstream, which will typically operate using soft information to back-map the modulation symbols into bits. The bits represented by soft information are supplied to a channel decoder 62 which may, for example, be implemented as a Viterbi decoder or as a Reed-Solomon decoder. The channel decoder 62 is based on the fact that on the decoder side a redundancy was introduced by the redundancy encoder 22 which is used by the channel decoder for purposes of improved receive quality and/or reduced bit error rate on the decoder side. The output data of the channel decoder are supplied to a source decoder 63 which will be the counterpart of the encoder side source encoder and which, in particular if the encoder of FIG. 4 is considered, will comprise first a bit stream deformatter, a downstream Huffman decoder, again a downstream re-quantizer and finally a synthesis filter bank to generate a decoded audio signal.

If the source decoder 63 receives main-channel data, it comprises all data needed for decoding including the spectral fine structure, and a high-quality output is achieved. If, however, only side-channel data is transmitted, like, for example, the spectral envelope of the original information signal, the source decoder will, for example, execute a signal synthesis, wherein the spectral fine structure is synthesized and weighted using the transmitted data of the spectral coarse structure, such that a synthesized spectrum is generated which is then supplied to the synthesis filter bank to generate a decoded audio signal which at least comprises speech intelligibility. The same procedure may be used when scale factors and/or code table indices are transmitted. In this case, all transmitted data are used according to their original purpose, while non-transmitted data are synthesized, for example by the synthetic generation of spectral values which are, regarded together in a scale factor band, weighted such that a certain energy distribution is achieved in the band, wherein the absolute energy is basically determined anyway by the scale factor which was directly transmitted in the side-channel data stream.

Alternatively, the side-channel data stream may also be a band-limited representation (e.g. up to 4 kHz) of the original data, so that the side channel and the main channel are only different regarding their bandwidth. In this case, the decoder for the side-channel data would not synthesize any further spectral values, but would only generate the narrow-banded signal the way it is.

If the side-channel data stream is the output signal of a speech encoder, however, like, for example that of a CELP encoder, as it is used in GSM, the inventive broadcast/radio receiver will also include a GSM speech decoder to generate the side-channel data when the level of the receive quality threshold is fallen below.

The quality observer 53 in FIG. 6 may be supplied with information about receive quality from different locations in the processing chain. The quality observer 53 is, however, advantageously fed directly by a channel estimator 64 typically present anyway in a radio receiver, wherein the estimator is implemented to estimate the wireless transmission channel with or without pilot tones. Depending on the implementation of the channel estimator, the same, e.g., already provides an SNR which is then only to be compared with the threshold by the quality observer 53 in order to generate a control signal 65 which controls a switch 66 to either output the main channel or the side channel.

In the illustration illustrated in FIG. 6 it was assumed that the source decoder outputs the main channel and the side channel in parallel, i.e. already with a compensated delay. This has the advantage that when the receive quality is fallen below a switchover has to be performed in the switch 66, i.e. that the decoded side-channel signal already exists. Alternatively, however, for saving current in particular in mobile devices, only the main channel can be separated out to be decoded, wherein a decoding of the side channel is only started when the receive quality falls below the threshold. This has the advantage that at the output of the source decoder only one signal is applied and that, thus, for the second signal, i.e., for example, for the main channel in the extreme operation or for the side channel in the normal operation no processor resources or battery resources are necessitated. In so far, the switch 66 also has to be regarded schematically, as it may already be integrated into the functionality of the decoder and may in principle also exist in any location where the main channel and the side channel already exist separately. If, e.g., the main channel and the side channel are already applied at the output of the demapper 61, the (changeover) switch 66 may already be arranged there to either feed the main channel or the side channel into the downstream channel decoder.

With regard to the quality observation 53 it is to be noted that, when the channel estimator 64 is not accessed or when additional data on the receive quality are desired, the main channel or the combined main-channel/side-channel signal may be accessed in any location to obtain an impression on the current receive quality and in particular on the receive quality of the main channel.

In the following, with reference to FIG. 7, a principle procedure according to an embodiment of the present invention on the receive side is demonstrated. It is assumed that a reproduction of the main channel is currently going on, as is indicated in step 70. In parallel to the reproduction of the main channel in step 70, an assessment of the quality of the main channel is taking place in step 72. Alternatively or additionally, as it was illustrated with regard to FIG. 6, also the receive quality in general, i.e. without direct relation to the main channel, may be assessed, for example when the channel estimator operating with or without pilot tones is used.

Figure 7:
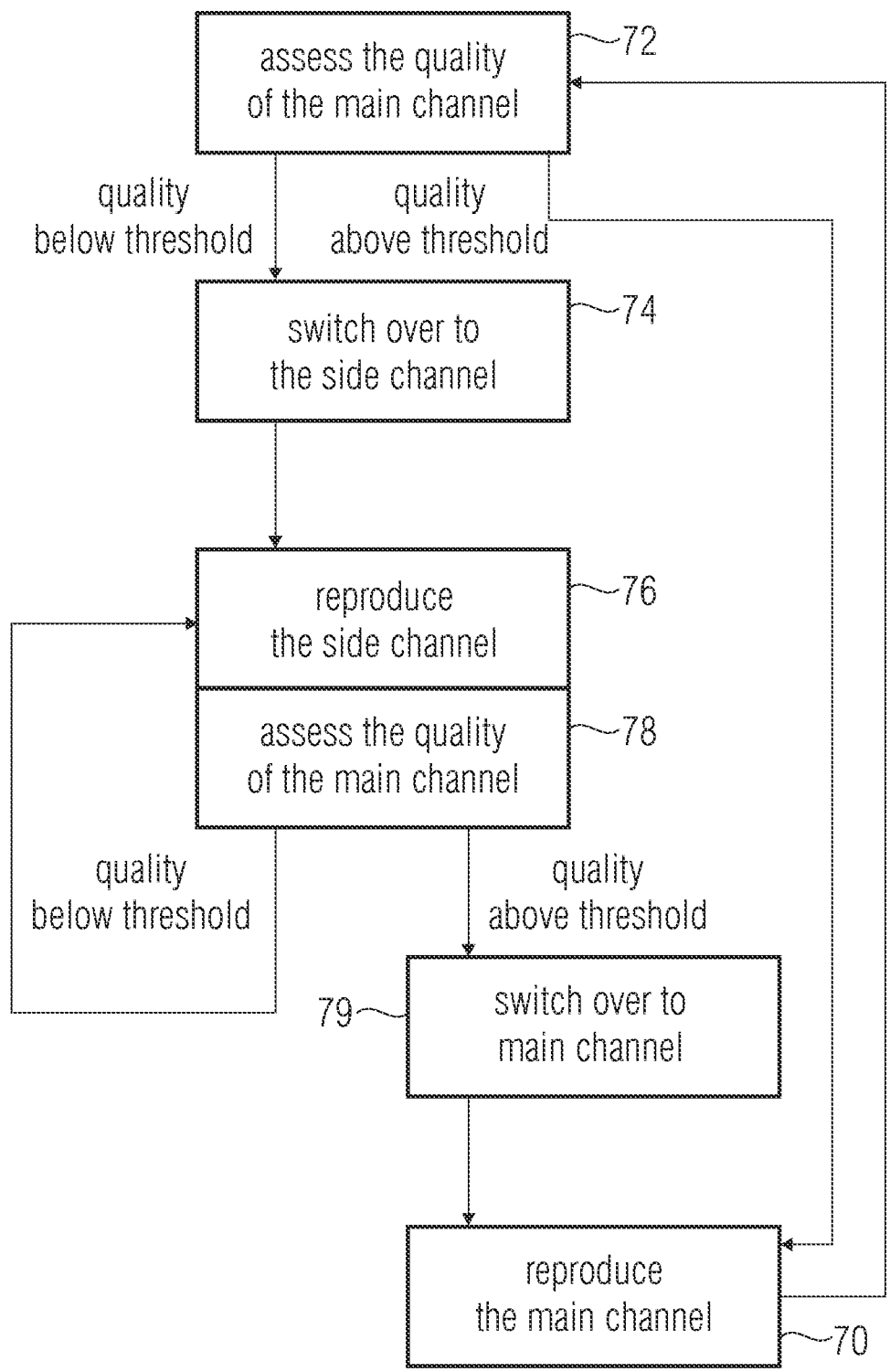
FIG. 7 shows a flowchart of the steps executed by the radio broadcasting subscriber, e.g. in a digital receiver.

Only for reasons of clarity, in FIG. 7 reference is made to a "quality of the main channel", which is assessed. If the quality assessed in block 72 is above the threshold, the reproduction of the main channel is continued in step 70. If it is determined, however, that the quality lies below the threshold, a switchover to the side channel is executed as illustrated in step 74. Hereupon, the side channel is reproduced, as it is indicated in step 76. In parallel or subsequently, an assessment of the quality of the main channel or generally of the receive quality is executed, as is illustrated at 78, wherein step 78 may be implemented identically to step 72. Differences are only that here a quality is assessed which is not the quality of the currently reproduced channel. If it is determined in field 78 that the quality is below the threshold, the reproduction of the side channel is continued. If it is determined in step 78 that the quality is above the threshold, a switchover to the main channel is executed, as illustrated in step 79.

When the signal is a video signal, the side channel may be a downsampled version of the main channel. The decimation of data is executed by the spatial decimation of, e.g., every second pixel per image vertically and horizontally and/or by the time decimation of, e.g., every second image of a sequence or by any other decimation measures.

Depending on the circumstances, the inventive method may be implemented in hardware or in software. The implementation may be on a digital storage medium, in particular a floppy disc or a DC having electronically readable control signals which may cooperate with a programmable computer system so that the method is executed. In general, the invention thus also consists in a computer program product having a program code stored on a machine-readable carrier for executing the inventive method when the computer program product runs on a computer. In other words, the invention may thus be realized as a computer program having a program code for executing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for generating a signal to be transmitted, comprising:
    an encoder for generating an encoded signal from an information signal, wherein the encoder is implemented
    to generate a main channel and a side channel which are decodable separate from each other and represent the information signal, and to generate the main channel and the side channel so that the side channel is more robust against transmission-channel influences than the main channel;

wherein the encoder is a source encoder which is implemented to execute a time-domain/spectral-domain conversion and which provides a description of a spectral envelope for generating the side-channel coefficients using fine quantization;

wherein, on a decoder side with a predetermined signal/noise ratio, a speech intelligibility is achievable; and wherein the side channel uses half or less than half as many bits as the main channel.

2. The device according to claim 1, wherein the encoder is implemented to generate the side channel so that it is a qualitatively worse representation of the information signal than the main channel.

3. The device according to claim 1, wherein the encoder is implemented to execute a lossy data compression with the information signal, wherein a compression factor in a generation of the side channel is higher than in a generation of the main channel, or wherein for the main channel a lossless data compression may be executed, while for the side channel a lossy data compression may be executed.

4. The device according to claim 1, wherein the encoder is implemented to generate the side channel such that it necessitates a lower bit rate for transmission than the main channel.

5. The device according to claim 1, wherein the encoder comprises a source encoder and a downstream redundancy encoder, wherein the redundancy encoder is implemented to generate the main channel with a first code rate and to generate the side channel with a second code rate which is smaller than the first code rate, wherein the code rates are smaller than 1 and are defined by the ratio of a number of input bits with regard to a number of output bits derived from the input bits.

6. The device according to claim 1, wherein the encoder comprises a mapper which is implemented to generate the main channel using a first mapping rule and to generate the side channel using a second mapping rule, wherein a signal/noise ratio for decoding the main channel is higher than a signal/noise ratio for decoding the side channel.

7. The device according to claim 6, wherein the second mapping rule defines more different mapping states than the first mapping rule.

8. The device according to claim 6, wherein a mapping state of the second mapping rule represents more bits than a mapping state of the first mapping rule.

9. The device according to claim 1, comprising:
a modulator for modulating information of the main channel and the side channel to a plurality of signal carriers, wherein the signal carriers are frequency carriers, time carriers and/or code carriers in an FDMA, TDMA and/or CDMA system.

10. The device according to claim 1, wherein the encoder comprises a source encoder comprising a speech encoder for generating the side channel and an audio encoder for generating the main channel, wherein the audio encoder necessitates more bits for a given time length of the information signal than the speech encoder.

11. The device according to claim 1, wherein the coefficients are LPC coefficients or derived from LPC coefficients.

12. The device according to claim 1, wherein the encoder comprises a source encoder which is implemented to generate both the main channel and also the side channel, wherein the source encoder further comprises a selector to select a part of the data generated by the source encoder to form the side channel using this data.

13. The device according to claim 1, which is implemented to feed a DAB or DRM transmitter or to feed a package-oriented data network.

14. The device according to claim 1, wherein the encoder is implemented to generate a further side channel with a different time offset and/or different robustness against channel influences which may also be decoded separately from the main channel and from the side channel.

15. A method for generating a signal to be transmitted, comprising:
generating an encoded signal from an information signal wherein the generating the encoded signal includes:
generating a main channel and a side channel which are decodable separate from each other and represent the information signal, and
wherein the main channel and the side channel are generated such that the side channel is more robust against transmission-channel influences than the main channel; and
wherein the generating the encoded signal includes executing a time-domain/spectral-domain conversion and providing a description of a spectral envelope for generating the side-channel coefficients using fine quantization;
wherein, on a decoder side with a predetermined signal/noise ratio, a speech intelligibility is achievable; and
wherein the side channel uses half or less than half as many bits as the main channel.

16. A non-transitory storage medium having stored thereon a computer program comprising a program code for executing, when the computer program runs on a computer, a method of generating a signal to be transmitted, the method comprising:
generating an encoded signal from an information signal, wherein the generating the encoded signal includes:
generating a main channel and a side channel which are decodable separate from each other and represent the information signal, and
wherein the main channel and the side channel are generated such that the side channel is more robust against transmission-channel influences than the main channel; and
wherein the generating the encoded signal includes executing a time-domain/spectral-domain conversion and providing a description of a spectral envelope for generating the side-channel coefficients using fine quantization;
wherein, on a decoder side with a predetermined signal/noise ratio, a speech intelligibility of more than 50% of the total transmitted words is achievable; and
wherein the side channel uses half or less than half as many bits as the main channel.

17. A device for generating a signal to be transmitted, comprising:
an encoder for generating an encoded signal from an information signal, wherein the encoder is implemented
to generate a main channel and a side channel which are decodable separately from each other and represent the information signal, and
to generate the main channel and the side channel so that the side channel is more robust against transmission-channel influences than the main channel;
wherein the encoder comprises a source encoder which is implemented to generate both the main channel and also the side channel, wherein the source encoder further comprises a selector to select a part of the data generated by the source encoder to form the side channel using this data; and wherein the encoder comprises a subband-based audio encoder and wherein the selector is implemented to select existing scale factors for each band, or wherein the encoder comprises a subband-based audio encoder which is implemented to encode quantized spectral values using different code books, wherein the code books represent value ranges of quantized spectral values of different sizes, and wherein code book indices are generated which each represent used code books for the quantized spectral values, and wherein the code book indices are generated representing the code books used for the quantized spectral values, and wherein the selector is implemented to select the code book indices.

18. A method for generating a signal to be transmitted, comprising:

generating an encoded signal from an information signal, wherein the encoded signal is implemented, by generating a main channel and a side channel which are decodable separately from each other and represent the information signal, and wherein the main channel and the side channel are generated such that the side channel is more robust against transmission-channel influences than the main channel;

wherein the generating the encoded signal comprises generating both the main channel and also the side channel, wherein the generating the encoded signal further comprises selecting a part of the data generated by the generating the encoded signal to form the side channel using this data; and wherein the generating the encoded signal comprises a subband-based audio encoding and wherein the selecting is implemented to select existing scale factors for each band, or wherein the generating the encoded signal comprises subband-based audio encoding which is implemented to encode quantized spectral values using different code books, wherein the code books represent value ranges of quantized spectral values of different sizes, and wherein code book indices are generated which each represent used code books for the quantized spectral values, and wherein the code book indices are generated representing the code books used for the quantized spectral values, and wherein the selecting comprises selecting the code book indices.

19. A non-transitory storage medium having stored thereon a computer program comprising a program code for executing, when the computer program runs on a computer, a method of generating a signal to be transmitted, the method comprising:

generating an encoded signal from an information signal, wherein the encoded signal is implemented, by generating a main channel and a side channel which are decodable separately from each other and represent the information signal, and wherein the main channel and the side channel are generated such that the side channel is more robust against transmission-channel influences than the main channel;

wherein the generating the encoded signal comprises generating both the main channel and also the side channel, wherein the generating the encoded signal further comprises selecting a part of the data generated by the generating the encoded signal to form the side channel using this data; and wherein the generating the encoded signal comprises a subband-based audio encoding and wherein the selecting is implemented to select existing scale factors for each band, or wherein the generating the encoded signal comprises subband-based audio encoding which is implemented to encode quantized spectral values using different code books, wherein the code books represent value ranges of quantized spectral values of different sizes, and wherein code book indices are generated which each represent used code books for the quantized spectral values, and wherein the code book indices are generated representing the code books used for the quantized spectral values, and wherein the selecting comprises selecting the code book indices.

* * * * *

UNITED STATES PATENT AND TRADEMARK OFFICE
CERTIFICATE OF CORRECTION

PATENT NO. : 9,659,566 B2
APPLICATION NO. : 14/722220
DATED : May 23, 2017
INVENTOR(S) : Gerald Schuller et al.

Page 1 of 1

It is certified that error appears in the above-identified patent and that said Letters Patent is hereby corrected as shown below:

On the Title Page

The Assignee in item (73) should read as follows:
--FRAUNHOFER-GESELLSCHAFT ZUR FOERDERUNG DER ANGEWANDTEN FORSCHUNG E.V. (Munich, DE)--

In the Claims

Claim 19, Column 16, Line 35 should read as follows:
--…wherein the encoder is implemented,…--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*